US008089352B2

(12) United States Patent
Park et al.

(10) Patent No.: US 8,089,352 B2
(45) Date of Patent: Jan. 3, 2012

(54) CONTROL APPARATUS AND METHOD

(75) Inventors: Kyu-Cheol Park, Seoul (KR);
Jung-Hwan Lee, Suwon-si (KR);
Won-Jang Park, Seoul (KR);
Byung-Chun Sakong, Suwon-si (KR);
Sang-Bum Kim, Seoul (KR)

(73) Assignee: Microinfinity, Inc., Seoul (KR)

( * ) Notice: Subject to any disclaimer, the term of this patent is extended or adjusted under 35 U.S.C. 154(b) by 179 days.

(21) Appl. No.: 12/230,737

(22) Filed: Sep. 4, 2008

(65) Prior Publication Data
US 2009/0066533 A1   Mar. 12, 2009

(30) Foreign Application Priority Data

Sep. 6, 2007 (KR) .................. 10-2007-0090561
Jul. 31, 2008 (KR) .................. 10-2008-0075103

(51) Int. Cl.
*G08B 23/00* (2006.01)
(52) U.S. Cl. ......... 340/517; 340/521; 340/524; 340/525
(58) Field of Classification Search .................. 340/500, 340/517, 518, 825.22, 520–525; 345/158, 345/156; 702/141; 455/466
See application file for complete search history.

(56) References Cited

U.S. PATENT DOCUMENTS

| | | | |
|---|---|---|---|
| 6,476,821 B2 * | 11/2002 | Sawada et al. ................ 345/620 |
| 6,834,249 B2 * | 12/2004 | Orchard ....................... 702/141 |
| 7,351,152 B2 * | 4/2008 | Abe et al. ....................... 463/43 |
| 7,573,382 B2 * | 8/2009 | Choubey et al. .......... 340/539.13 |
| 7,679,604 B2 * | 3/2010 | Uhlik et al. ................... 345/158 |
| 7,728,316 B2 * | 6/2010 | Fadell et al. .............. 250/559.38 |
| 2007/0232336 A1* | 10/2007 | Kim et al. ...................... 455/466 |
| 2008/0122785 A1* | 5/2008 | Harmon ........................ 345/156 |
| 2008/0309508 A1* | 12/2008 | Harmon ..................... 340/686.1 |

OTHER PUBLICATIONS

The Chinese Office Action, issued on Sep. 21, 2011, by the SIPO for corresponding Chinese Patent Application No. 200880106083.5, in Chinese with English translation; 10 pages total.
"Lenovo i721 mobile phones guide V1.0", (2007); Author: yzzw001; available online: http://news.imobile.com.cn/article-a-view-id-52098.html; in Chinese with English translation by google translate; 9 pages total.

* cited by examiner

*Primary Examiner* — Van T. Trieu

(74) *Attorney, Agent, or Firm* — The Nath Law Group; Jerald L. Meyer; Robert T. Burns

(57) ABSTRACT

Provided are a control apparatus and method. The control apparatus includes: a measurement module which measures a motion of the control apparatus due to an external force; and a signal generation module which generates a signal corresponding to the measured motion, wherein the signal is transmitted to a display device to adjust a state of the display device according to the signal.

28 Claims, 14 Drawing Sheets

FIG. 3
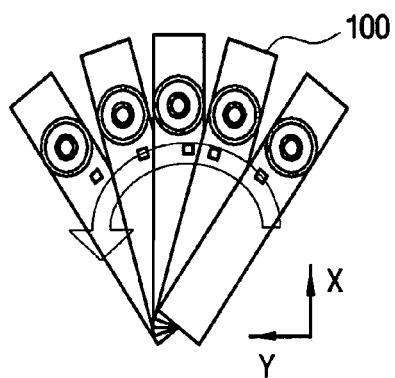
Z-AXIS: ROTATE IN COUNTERCLOCKWISE DIRECTION
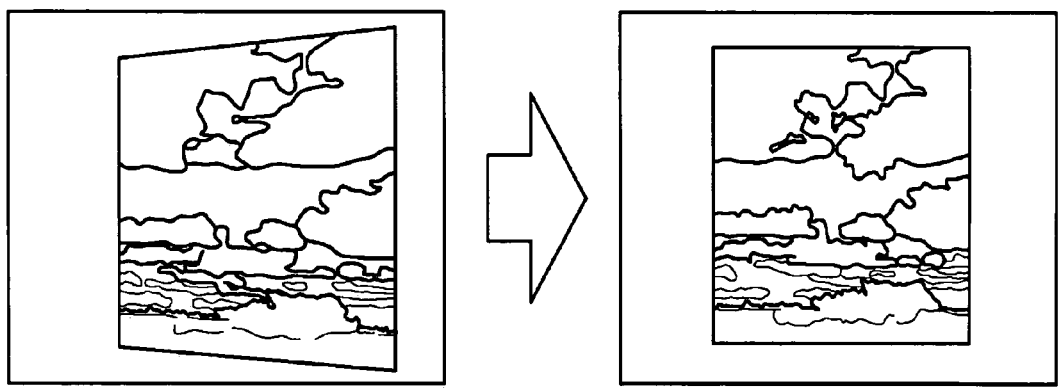

FIG. 4
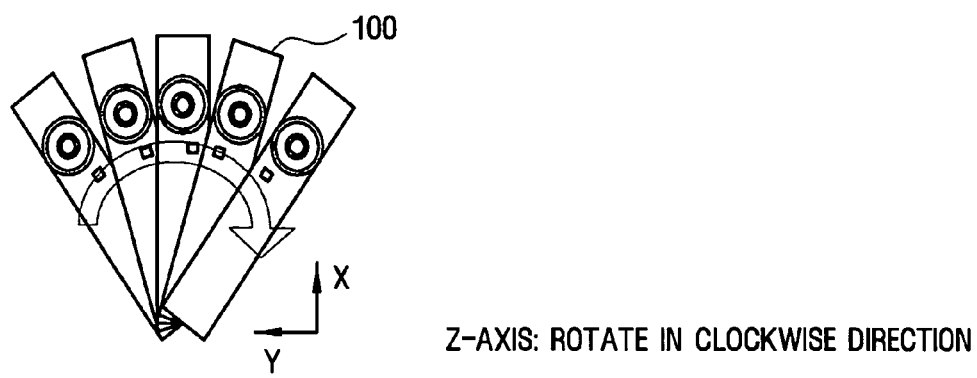
Z-AXIS: ROTATE IN CLOCKWISE DIRECTION
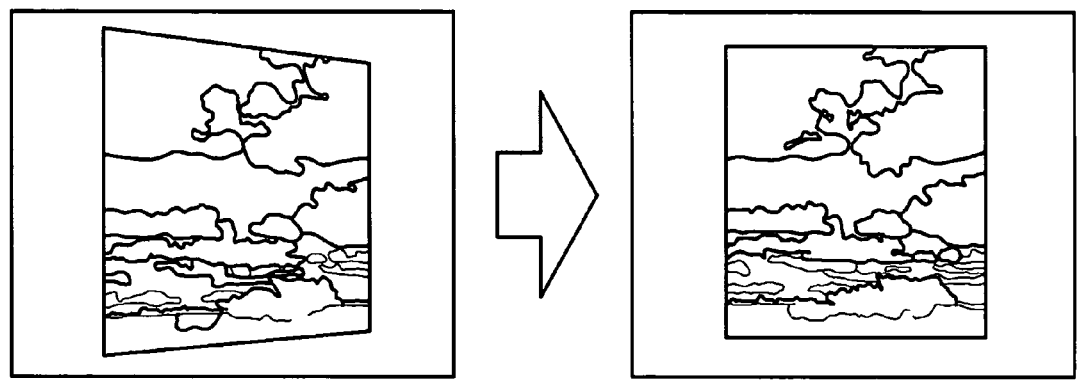

FIG. 5
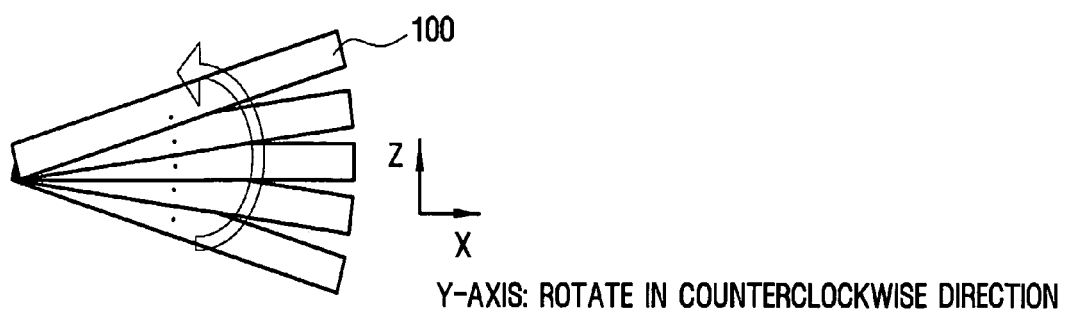
Y-AXIS: ROTATE IN COUNTERCLOCKWISE DIRECTION
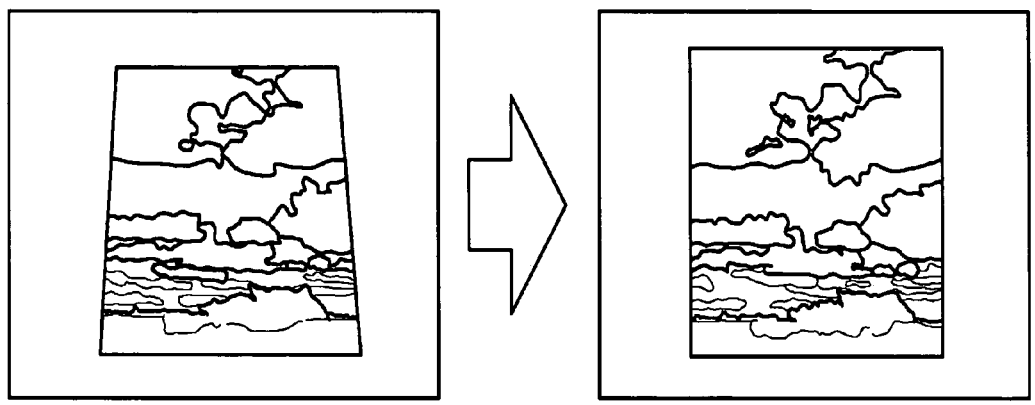

FIG. 6
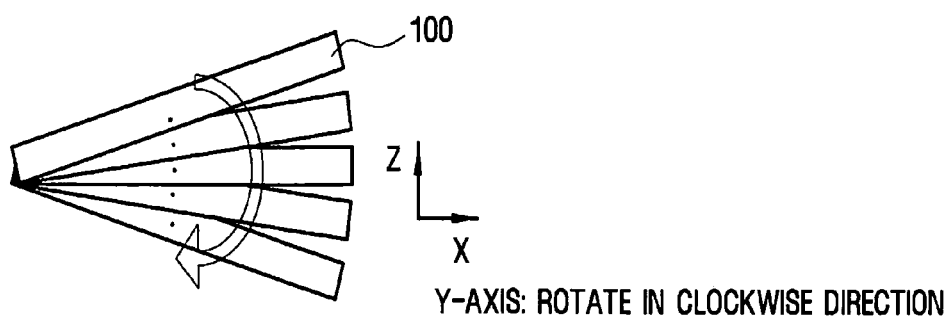
Y-AXIS: ROTATE IN CLOCKWISE DIRECTION
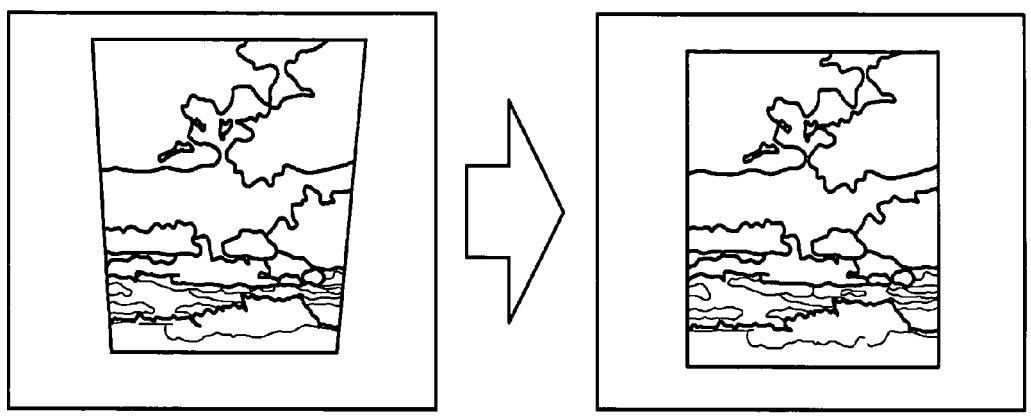

FIG. 7
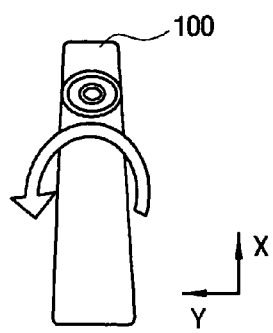
X-AXIS: ROTATE IN COUNTERCLOCKWISE DIRECTION
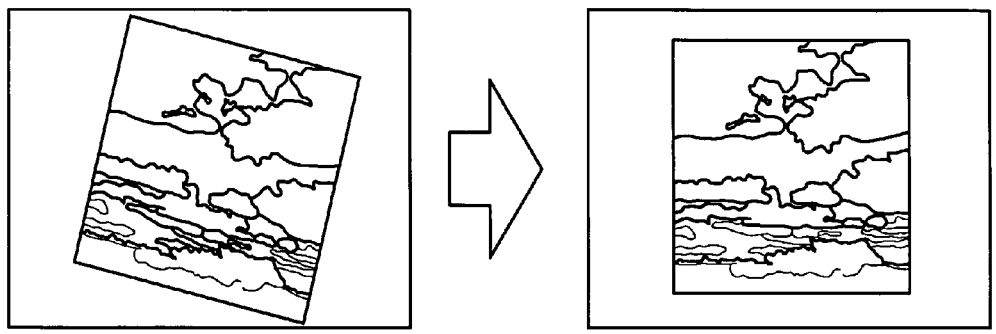

FIG. 8
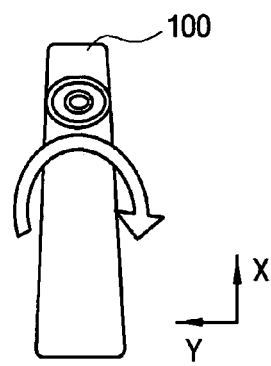
X-AXIS: ROTATE IN CLOCKWISE DIRECTION
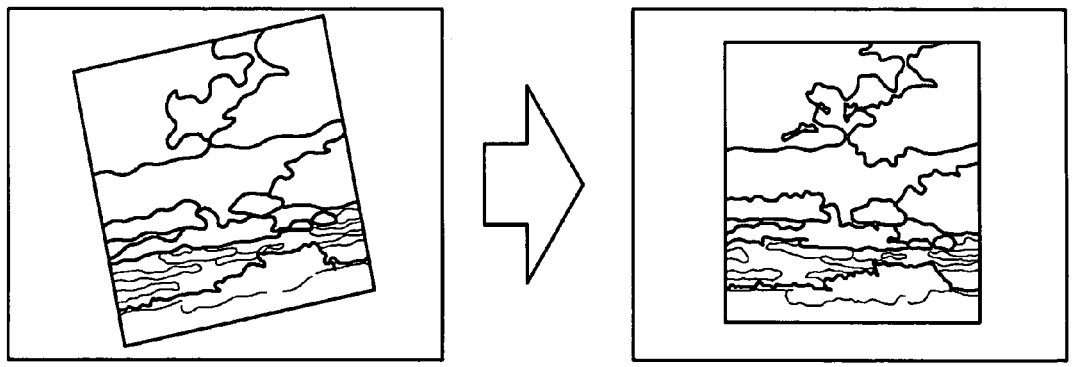

FIG. 9
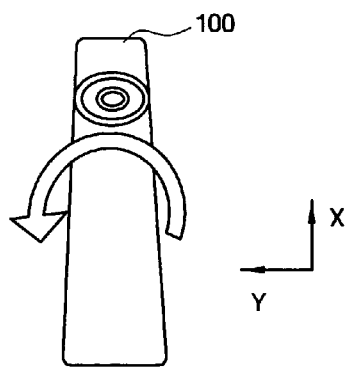
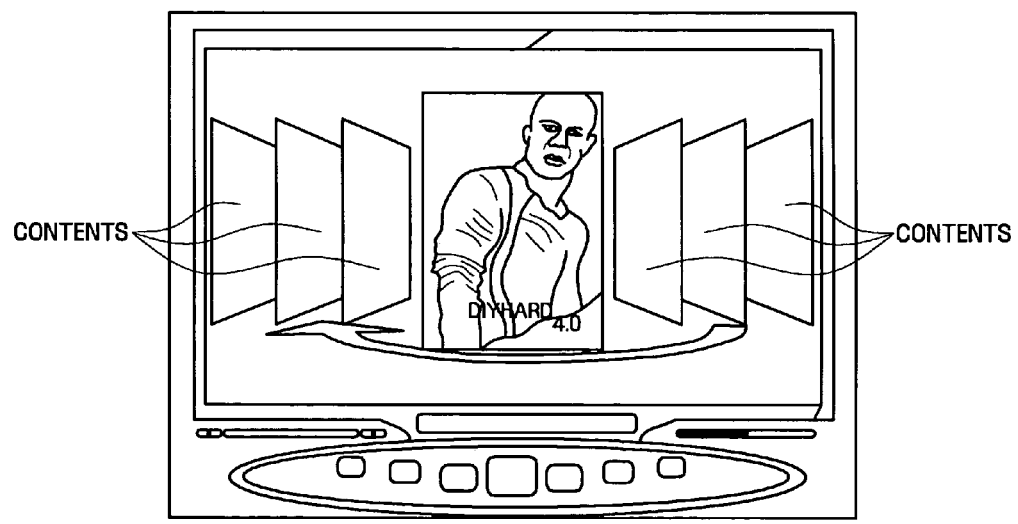

FIG. 10
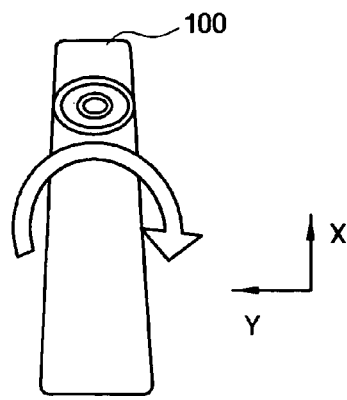
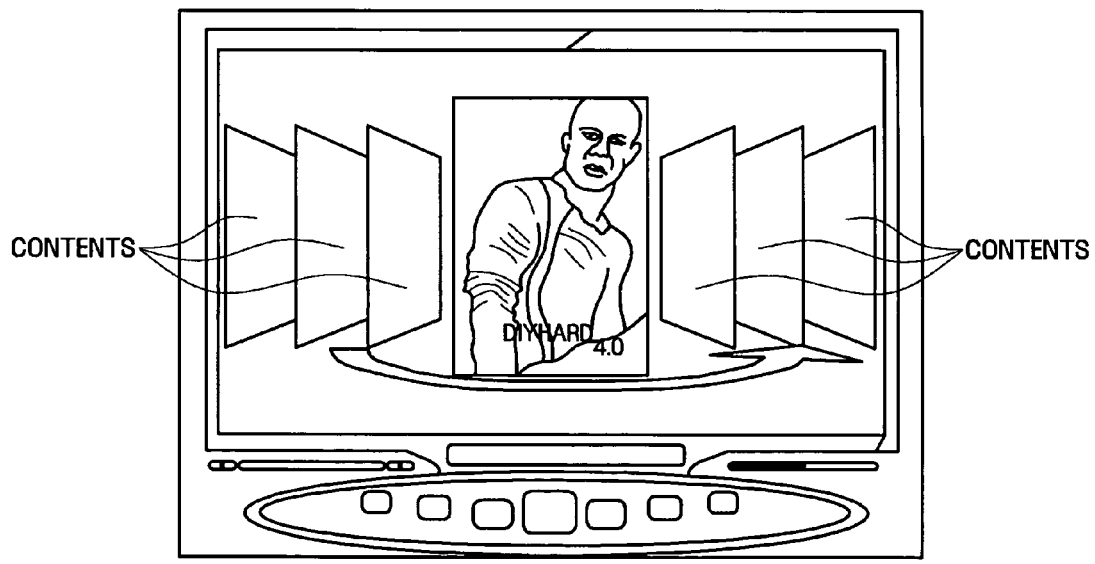

FIG. 11
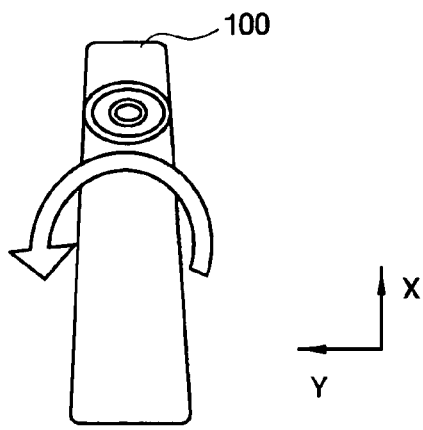
X-AXIS: ROTATE IN COUNTERCLOCKWISE DIRECTION
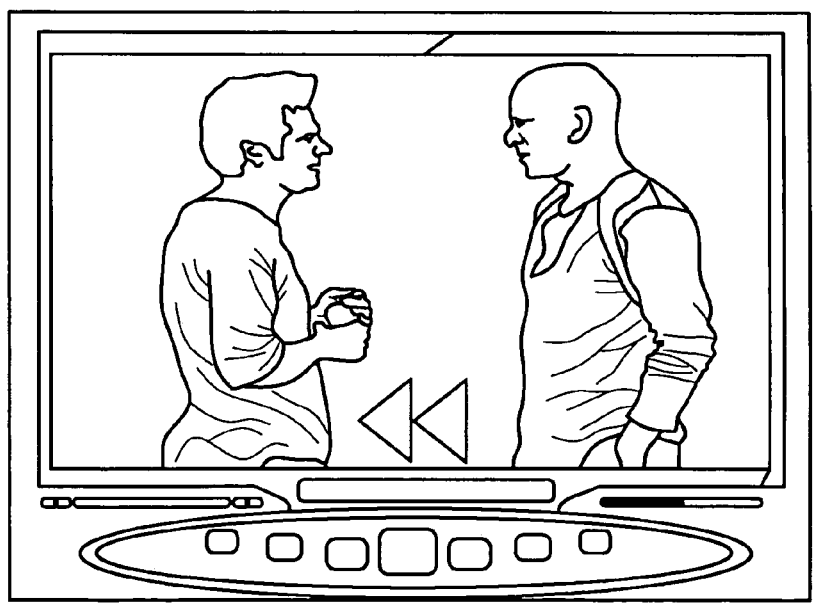

FIG. 12
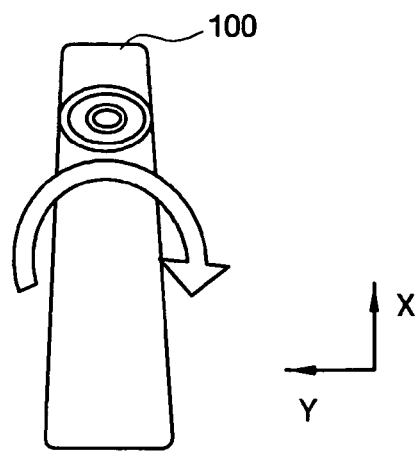
X-AXIS: ROTATE IN CLOCKWISE DIRECTION
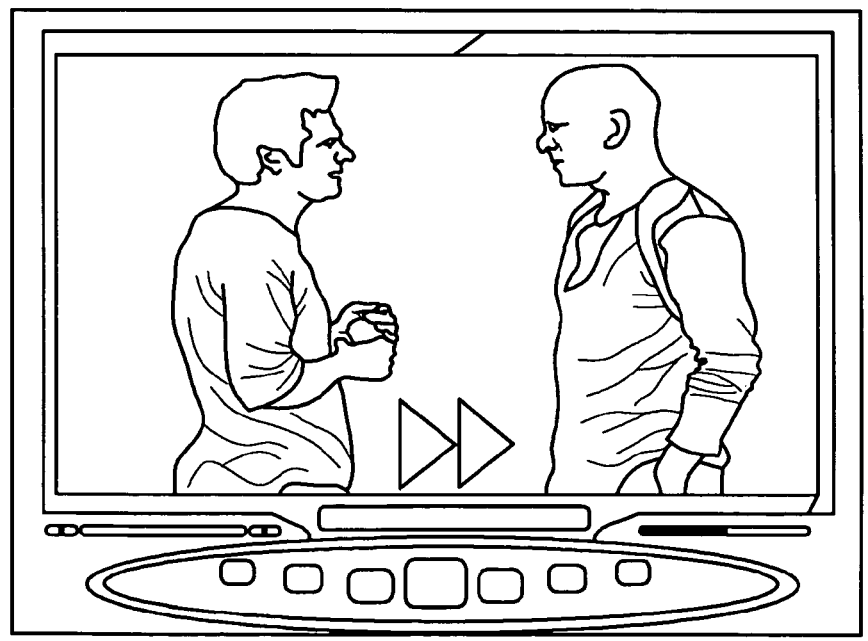

FIG. 13
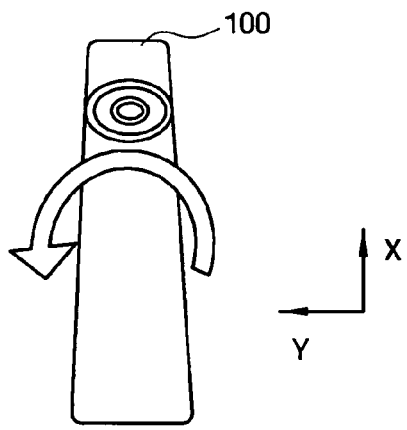
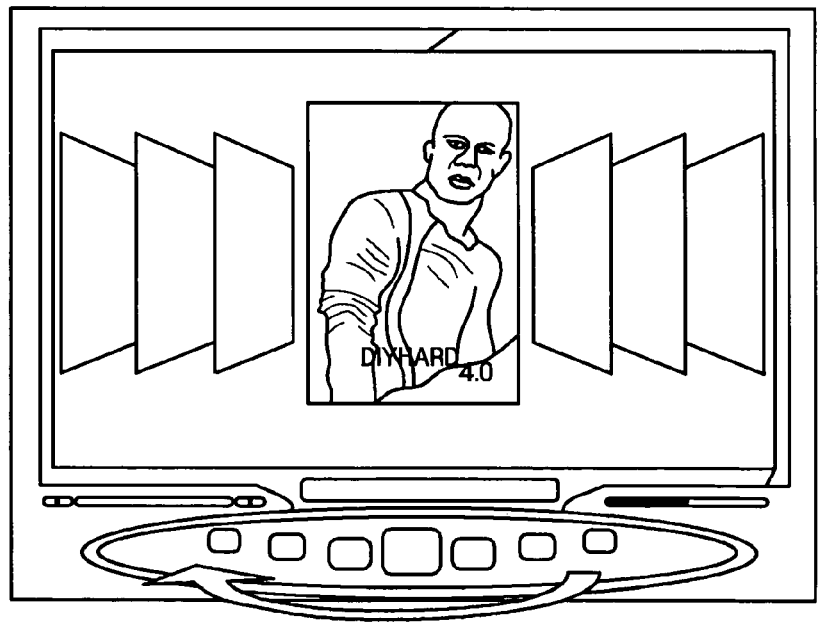
X-AXIS: ROTATE IN COUNTERCLOCKWISE DIRECTION

FIG. 14
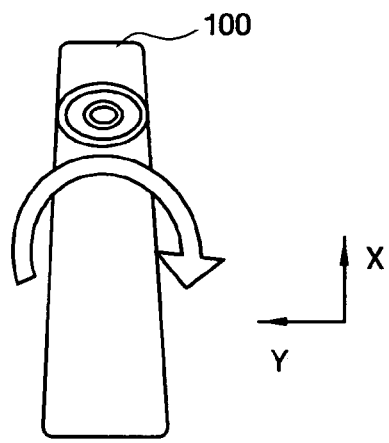
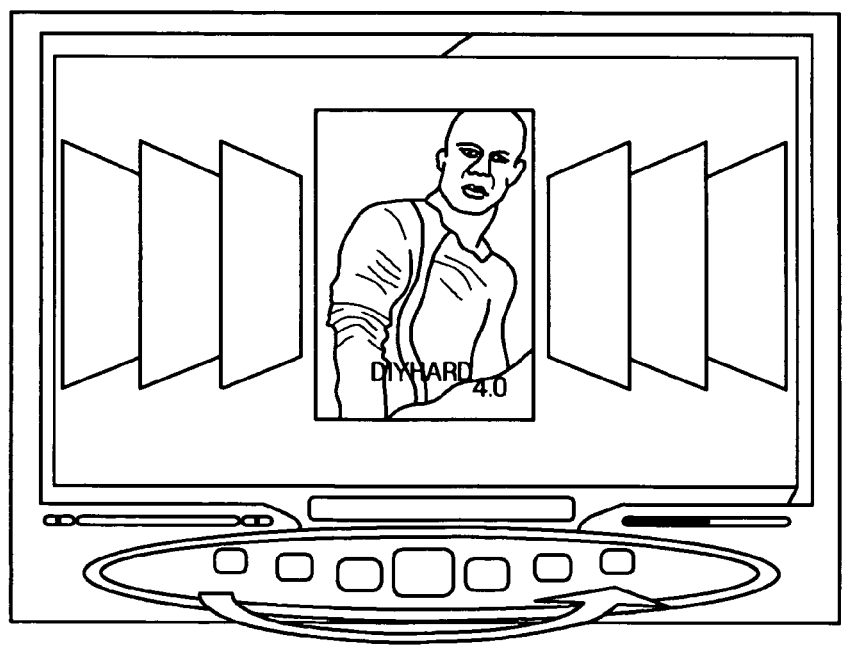
X-AXIS: ROTATE IN CLOCKWISE DIRECTION

CONTROL APPARATUS AND METHOD

This application claims priority from Korean Patent Application No. 10-2007-0090561 filed on Sep. 6, 2007 and Korean Patent Application No. 10-2008-0075103 filed on Jul. 31, 2008 in the Korean Intellectual Property Office, the disclosure of which is incorporated herein by reference in its entirety.

BACKGROUND OF THE INVENTION

1. Field of the Invention

The present invention relates to a control apparatus and method, and more particularly, to a control apparatus, which includes a measurement module measuring the motion of the control apparatus due to an external force and a signal generation module generating a signal corresponding to the measured motion to control the state of a display device, and a control method.

2. Description of the Related Art

According to the prior art with respect to a method of controlling a display device using a control apparatus such as a remote controller, a user has to push direction key buttons within the control apparatus for several times for execution, which is inconvenient. Hence, there is a need for controlling a display apparatus by moving the control apparatus in all directions (right, left, up and down) or rotating the control apparatus but without manipulating key buttons.

An input apparatus using operation of a person measures movements of all directions (right, left, up and down) or intuitively controls movements of a pointer on the screen of the display device, thereby improving inconvenience of a control apparatus according to the prior art.

SUMMARY OF THE INVENTION

Aspects of the present invention provide a control apparatus and method, in which an inertial sensor, etc. included in the control apparatus measures the motion of the control apparatus and generates a signal corresponding to the measured motion to control and adjust the state of a display device.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, there is provided a control apparatus including: a measurement module which measures a motion of the control apparatus due to an external force; and a signal generation module which generates a signal corresponding to the measured motion, wherein the signal is transmitted to a display device to adjust a state of the display device according to the signal.

According to another aspect of the present invention, there is provided a control method including: measuring a motion of a control apparatus due to an external force; generating a signal corresponding to the measured motion; transmitting the signal to a display device and adjusting a state of the display device.

BRIEF DESCRIPTION OF THE DRAWINGS

The above and other aspects and features of the present invention will become more apparent by describing in detail exemplary embodiments thereof with reference to the attached drawings, in which:

FIG. 3 shows a change in the state of a display device when the control apparatus of FIGS. 1 and 2 rotates about Z-axis;

FIG. 4 shows a change in the state of a display device when the control apparatus of FIGS. 1 and 2 rotates about Z-axis;

FIG. 5 shows a change in the state of a display device when the control apparatus of FIGS. 1 and 2 rotates about Y-axis;

FIG. 6 shows a change in the state of a display device when the control apparatus of FIGS. 1 and 2 rotates about Y-axis;

FIG. 7 shows a change in the state of a display device when the control apparatus of FIGS. 1 and 2 rotates about X-axis;

FIG. 8 shows a change in the state of a display device when the control apparatus of FIGS. 1 and 2 rotates about X-axis;

FIGS. 9 and 10 show a screen on which desired contents are selected from a playlist of contents stored in a display device when the control apparatus of FIGS. 1 and 2 rotates about X-axis; and FIGS. 11 and 12 show a state in which a display device rewinds or fast-forwards contents currently being reproduced when the control apparatus of FIGS. 1 and 2 rotates about X-axis.

FIGS. 13 and 14 show a selection of a menu displayed in a display device when the control apparatus of FIGS. 1 and 2 rotates about X-axis.

DETAILED DESCRIPTION OF THE INVENTION

Figure 1:
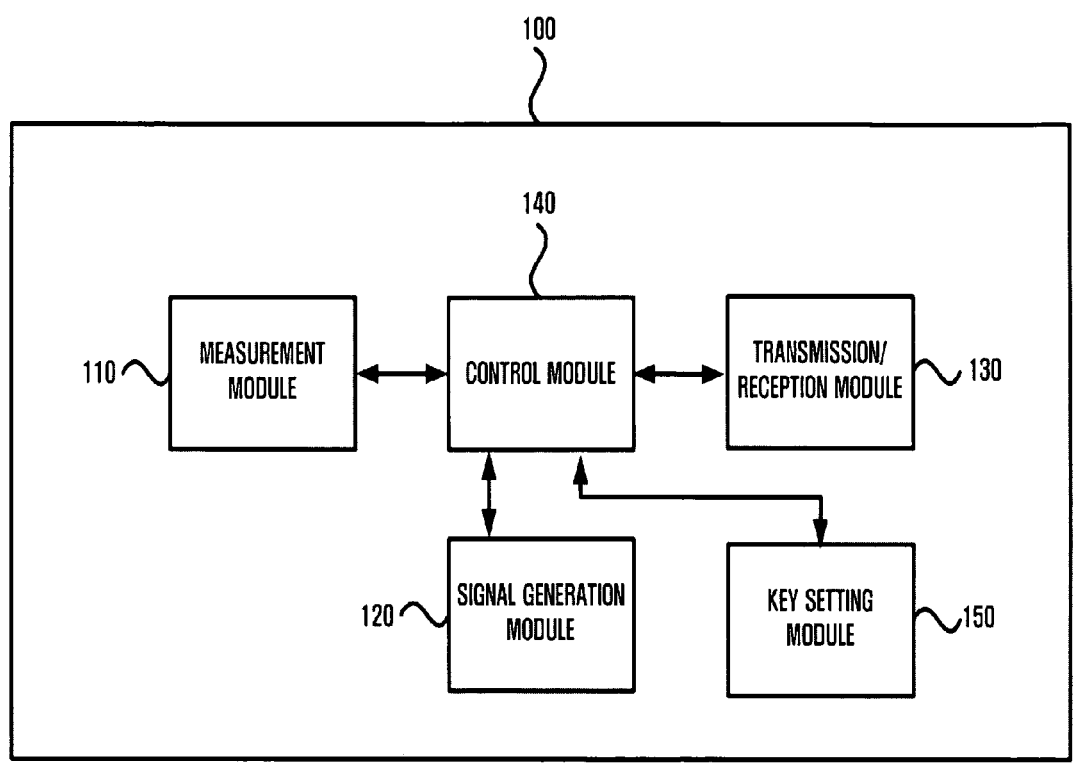
FIG. 1 is a block diagram of a control apparatus according to an exemplary embodiment of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Hereinafter, a control apparatus and method according to exemplary embodiments of the present invention will be described with reference to the attached drawings.

FIG. 1 is a block diagram of a control apparatus 100 according to an exemplary embodiment of the present invention. Referring to FIG. 1, the control apparatus 100 includes a measurement module 110 and a signal generation module 120. The control apparatus 100 may further include a control module 130, a transmission/reception module 140, and a key setting module 150.

When the control apparatus 100 is operated by a user or an external force, the measurement module 110 measures the motion direction of the control apparatus 100 and the distance traveled by the control apparatus 100. In this case, the motion of the control apparatus 100 includes a change in posture or position by translation and rotation. In addition, the distance traveled by the control apparatus 100 includes the distance horizontally traveled by the control apparatus 100 and the distance rotated by the control apparatus 100, which will be described in detail later with reference to FIGS. 3 through 8.

The measurement module 110 includes a conventional inertial sensor that is widely used. The inertial sensor may include an acceleration sensor, an angular velocity sensor, a gyro sensor, and a terrestrial magnetic sensor. The measurement module 110 may further include a magnetic sensor, a vision sensor, an infrared sensor, a pressure sensor, and a sonar sensor. The inertial sensor may measure the angular velocity, angular acceleration, acceleration, etc. of the control apparatus 100 and calculate the motion direction of the control apparatus 100 and the distance traveled by the control apparatus 100.

As an exemplary embodiment, the measurement module 110 may include a yaw gyro sensor and an acceleration sensor. The measurement module 110 may use the acceleration sensor to calculate a value (a roll value) of the distance rotated by the control apparatus 100 about an X-axis and a value (pitch value) of the distance rotated by the control apparatus 100 about a Y-axis and use the yaw gyro sensor to calculate a value (a yaw value) of the distance rotated by the control apparatus 100 about a Z-axis. Here, X-axis, Y-axis and Z-axis can be arbitrarily set. For example, when a control apparatus according to an exemplary embodiment is mounted, the direction vertical to the surface can be set to Z-axis, the direction toward a display to be controlled by the control apparatus can be set to X-axis, and the direction vertical to both X-axis and Z-axis can be set to Y-axis. Hereinafter, it is assumed that X-axis, Y-axis and Z-axis are set as above.

In an embodiment, the value of the distance rotated about the X-axis and the value of the distance rotated about the Y-axis may be calculated as follows by using the three-axis acceleration sensor. On the X- and Y-axes that are horizontal to a ground surface, if acceleration in the direction of the X-axis is a_x and if acceleration of gravity is "g," a pitch θ is given by θ=arcsin(a_x/g).

In addition, if it is supposed that a pitch is already occurred, when acceleration in the direction of the Y direction is a_y, a vertical component of acceleration of gravity is g·cos θ. Therefore, a roll φ is given by φ=arctan(a_y/a_z)

After the measurement module 110 measures the motion direction of the control apparatus 100 and the distance traveled by the control apparatus 100, the signal generation module 120 generates a signal that reflects the measurements. A specific value is given to the signal according to the motion direction and the distance traveled. The signal that reflects the specific value controls and adjusts the state of a display device. That is, the signal is transmitted to the display device to control the state of the display device. The state of the display device may include screen brightness of the display device, sound volume of the display device, screen position of the display device, content control (i.e., rewind and fast-forward) and selection of content replayed or displayed in the display device, selection of a menu displayed in the display device, screen enlargement movement and screen stabilization, which will be described in detail later with reference to FIGS. 3 through 14.

The signal generation module 120 may be included in the measurement module 110. As described above, the inertial sensor may generate a signal. Here, a specific value, which corresponds to the motion direction and the distance traveled, may be assigned according to given specifications of the inertial sensor, and a signal that reflects the specific value may be generated.

Once the signal generation module 120 generates a signal, the transmission/reception module 130 transmits the generated signal to the display device and receives a signal generated by the display device.

The key setting module 150 enables a user to select a screen brightness control mode, a sound volume control mode, a screen position control mode, a content control mode, a content selection mode, a menu selection mode, a screen enlargement movement mode, a screen stabilization mode, or the like.

In the content control mode, the user may rewind or fast forward contents, which are being reproduced, in order to search for a desired scene. In the content selection mode, the user may select desired contents from contents stored in the display device and reproduce the selected contents. According to an embodiment, representative images of contents may be displayed on the display device. Thus, in the content selection mode, the user may select at least one content from contents, which precede or follow contents currently being reproduced, based on the representative images.

The above modes are a mere embodiment of the present invention. Thus, other functions (i.e., modes) can be added as desired.

After selecting the screen brightness control mode, the user may control the screen brightness of the display device by using the control apparatus 100 as described above. After selecting the sound volume control mode, the user may control the sound volume of the display device by using the control apparatus 100 as described above.

After selecting the screen position control mode, the user may control the screen position of the display device by using the control apparatus 100 as described above. After selecting the content control mode, the user may choose to rewind or fast forward contents, which are being reproduced, by using the control apparatus 100 as described above.

After selecting the content selection mode, the user may select desired contents to view by using the control apparatus 100 as described above.

After selecting the menu selection mode, the user may select a menu displayed in the display screen by using the control apparatus 100 as described above.

After selecting the screen enlargement movement mode, the user may move the current screen to a screen connected to four directions (right, left, up and down) by using the control apparatus as described above.

After selecting the screen stabilization mode, the user may stabilize a trembling screen due to external vibrations by using the control apparatus as described above.

A specific method of selecting the above modes will be described later with reference to FIGS. 3 through 14.

The key setting module 150 may set the screen position control mode by default. The transmission/reception module 130 may transmit or receive signals in a wired or wireless manner. In particular, the transmission/reception module 130 may have a Bluetooth chip that can use a local area wireless communication technology such as Bluetooth.

The control module 140 controls and manages the measurement module 110, the signal generation module 120, the transmission/reception module 130, and the key setting module 150 included in the control apparatus 100. When the user sets a specific mode by using the key setting module 150, the control module 140 generates a signal corresponding to the set mode in order to control the measurement module 110 and the signal generation module 120.

In an exemplary embodiment of the present invention, the control apparatus 100 may be loaded in a remote controller and a pointing device. In an embodiment, system may be implemented with a display device (such as a projector, a monitor or a television (TV)) and, and the control apparatus 100 may be used to control the screen brightness, sound volume and screen position of the display device.

Figure 2:
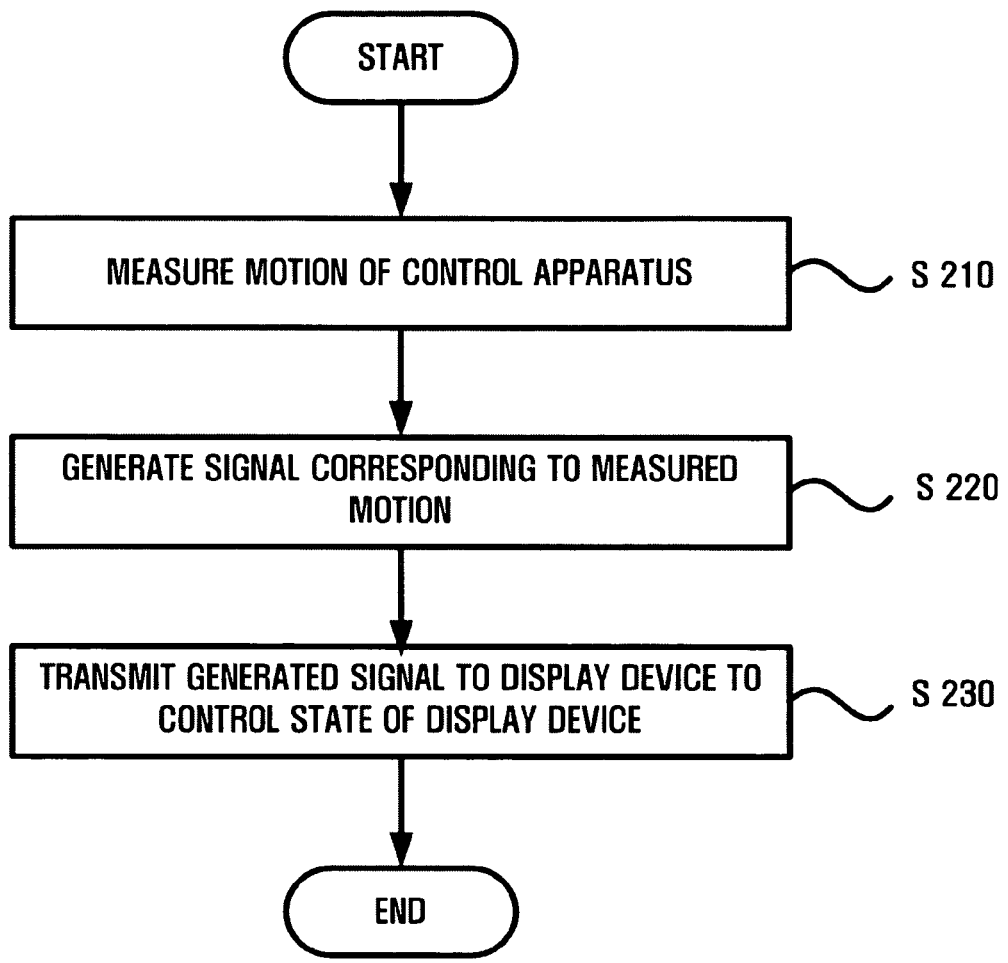
FIG. 2 is a flowchart illustrating a method of controlling the state of a display device by using the control apparatus of FIG. 1, according to an exemplary embodiment of the present invention.

FIG. 2 is a flowchart illustrating a method of controlling the state of a display device by using the control apparatus 100, according to an exemplary embodiment of the present invention.

Referring to FIG. 2, a user may select the screen brightness control mode, the sound volume control mode, the screen position control mode, the content control mode, the content selection mode, the menu selection mode, the screen enlargement movement mode, the screen stabilization mode, or the like. The above modes are a mere embodiment of the present invention. Thus, other functions (i.e., modes) can be added as desired. In addition, the screen position control mode may be set by default.

After the user selects any one of the above modes, if the control apparatus 100 is operated by the user or an external force, the motion of the control apparatus 100 is measured (operation S210). As described above, an inertial sensor measures the motion of the control apparatus 100. Thus, a specific value is determined based on specifications of an inertial sensor used by the control apparatus 100. Controlling the screen brightness, screen position and sound volume of the display device and the content control mode, the content selection mode and the menu selection mode will be described later with reference to FIGS. 3 through 14.

After the motion of the control apparatus 100 is measured, the signal generation module generates a signal corresponding to the measured motion (operation S220). The generated signal has a value assigned according to the motion direction of the control apparatus 100 and the distance traveled by the control apparatus 100. The signal that reflects the assigned value controls and adjusts the state of the display device.

Once the signal is generated, it is transmitted to the display device to control the state of the display device (operation S230). In response to the received signal that reflects the specific value, the display device controls and adjusts its screen brightness, screen position, sound volume and the like.

If the user selects the screen brightness control mode, the display device displays its adjusted screen state. Then, the user may readjust the screen state of the display device by using the control apparatus 100. When the user selects the screen position control mode, the display device may display its adjusted screen state. Then, the user may readjust the screen state of the display device by using the control apparatus 100.

When the user selects the sound volume control mode, the display device may inform its adjusted sound volume through its speaker. Then, the user may readjust the sound volume of the display device by using the control apparatus 100. When the user selects the content control mode, the display device may search for a scene desired by the user by using functions such as rewind and fast-forward. After selecting the content selection mode, the user may select desired contents from contents stored in the display device and reproduce the selected contents. The user may readjust the above modes by using the control apparatus 100 to adjust and select contents. After selecting the menu selection mode, the user may select a menu displayed in the display. After selecting the screen enlargement movement mode, the user may move the current screen to a screen connected to four directions (right, left, up and down). After selecting the screen stabilization mode, the user may stabilize a trembling screen due to external vibrations.

In addition, the control apparatus 100 may receive from the display device a signal indicating whether the display device has received a signal sent by the control apparatus 100 and indicating whether the display device has adjusted its state in response to the signal received from the control apparatus 100 and may readjust the state of the display device based on the signal received from the display device.

In an exemplary embodiment of the present invention, system may be implemented with a display device (such as a projector, a monitor or a TV) and the control apparatus 100 may be used to control the screen brightness, sound volume and screen position of the display device.

An exemplary embodiment of the present invention will now be described with reference to FIGS. 3 through 14. FIG. 3 shows a change in the state of a display device when the control apparatus 100 of FIGS. 1 and 2 rotates about Z-axis.

Referring to FIG. 3, when it is set to the screen position control mode, if the control apparatus 100 rotates counterclockwise based on Z-axis, the display device can "trapezoid" its screen. As used herein, the term "trapezoid" denotes increasing the length of a left side of the screen of the display device to that of a right side when the left side is shorter than the right side. Therefore, when the control apparatus 100 rotates about the axis, the screen of the display device is "trapezoided" to have a rectangular shape with right and left sides that are the same length.

When it is set to the screen brightness control mode (not illustrated), if the control apparatus 100 rotates about Z-axis, the screen brightness of the display device can be increased.

When it is set to the sound volume control mode, if the control apparatus 100 rotates about Z-axis, the sound volume of the display device can be increased.

FIG. 4 shows a change in the state of a display device when the control apparatus 100 of FIGS. 1 and 2 rotates about Z-axis.

Referring to FIG. 4, when it is set to the screen position control mode, if the control apparatus 100 rotates about Z-axis in a direction opposite to the direction (clockwise) in which the control apparatus 100 rotates in FIG. 3, the display device can "trapezoid" its screen. As described above, the term "trapezoid" denotes increasing the length of a right side of the screen of the display device to that of a left side when the right side is shorter than the left side. Therefore, when the control apparatus 100 rotates about the axis, the screen of the display device is "trapezoided" to have a rectangular shape with right and left sides that are the same length.

When it is set to the screen brightness control mode, if the control apparatus 100 rotates about the axis in the direction opposite to the direction in which the control apparatus 100 rotates in FIG. 3, the screen brightness of the display device can be reduced.

When it is set to the sound volume control mode, if the control apparatus 100 rotates about the axis in the direction opposite to the direction in which the control apparatus 100 rotates in FIG. 3, the sound volume of the display device can be reduced.

FIG. 5 shows a change in the state of a display device when the control apparatus 100 of FIGS. 1 and 2 rotates about Y-axis.

Referring to FIG. 5, when it is set to the screen position control mode, if the control apparatus 100 rotates about Y axis (counterclockwise), the display device "top-corners" its screen. As used herein, the term "top-corner" denotes increasing the length of an upper side of the screen of the display device to that of a lower side when the upper side is shorter than the lower side. As an exemplary embodiment, if the control apparatus 100 rotates about the axis in a counterclockwise direction, the screen of the display device has a rectangular shape with upper and lower sides that are the same length.

FIG. 6 shows a change in the state of a display device when the control apparatus 100 of FIGS. 1 and 2 rotates about Y-axis.

Referring to FIG. 6, when it is set to the screen position control mode, if the control apparatus 100 rotates about the axis in a direction opposite to the direction (clockwise) in which the control apparatus 100 rotates in FIG. 5, the display device "down-corners" its screen. As used herein, the term "down-corner" denotes increasing the length of a lower side of the screen of the display device to that of an upper side when the lower side is shorter than the upper side, which is also called "bottom-corner." Therefore, if the control apparatus 100 rotates about the axis, the screen of the display device has a rectangular shape with upper and lower sides that are the same length.

FIG. 7 shows a change in the state of a display device when the control apparatus 100 of FIGS. 1 and 2 rotates about X-axis.

Referring to FIG. 7, when it is set to the screen position control mode, if the control apparatus 100 rotates about X-axis, the display device "rotates" its screen. As used herein, the term "rotate" denotes turning the screen of the display device in the counterclockwise direction when the screen of the display device has turned in a clockwise direction. Therefore, if the control apparatus 100 rotates about X-axis in the counterclockwise direction, the screen of the display device, which has rotated in the clockwise direction, rotates in the counterclockwise direction.

FIG. 8 shows a change in the state of a display device when the control apparatus 100 of FIGS. 1 and 2 rotates about an axis.

Referring to FIG. 8, when the screen position control mode is set, if the control apparatus 100 rotates about the axis in a direction opposite to the direction in which the control apparatus 100 rotates in FIG. 7, the display device "rotates" its screen. As used herein, the term "rotate" denotes turning the screen of the display device in the clockwise direction when the screen of the display device has turned in the counterclockwise direction. Therefore, if the control apparatus 100 rotates about the axis in the clockwise direction, the screen of the display device, which has rotated in the counterclockwise direction, rotates in the clockwise direction.

FIGS. 9 and 10 show a screen on which desired contents are selected from a playlist of contents stored in a display device when the control apparatus 100 of FIGS. 1 and 2 rotates about X-axis.

Referring to FIGS. 9 and 10, when it is set to the content selection mode, if the control apparatus 100 rotates about X-axis, the display device may select different contents from contents that are currently being reproduced by a user. The display device may display the contents stored therein, and the user may select desired contents from the displayed contents by rotating the control apparatus 100.

In an exemplary embodiment, if the control apparatus 100 rotates in a counterclockwise direction based on X-axis, the user can move to contents that precede the contents currently being reproduced. If the control apparatus 100 rotates in a clockwise direction, the user can move to contents that follow the contents currently being reproduced.

FIGS. 11 and 12 show a state in which a display device rewinds or fast-forwards contents currently being reproduced when the control apparatus 100 of FIGS. 1 and 2 rotates about X-axis.

Referring to FIGS. 11 and 12, when it is set to the content control mode, if the control apparatus 100 rotates about the axis, the display device rewinds or fast-forwards the contents that are currently being reproduced in order to move to a scene desired by a user. As used herein, the term "rewind" denotes winding contents currently being reproduced backward to show a previous scene, and the term "fast forward" denotes winding the contents currently being reproduced forward.

In an exemplary embodiment, if the control apparatus 100 rotates in a counterclockwise direction, the display device executes the rewind mode. If the control apparatus 100 rotates in a clockwise direction, the display device executes the fast-forward mode.

FIGS. 13 and 14 shows selecting a menu displayed in a display device when the control apparatus 100 of FIGS. 1 and 2 rotates about X-axis.

Referring to FIGS. 13 and 14, when it is set to the menu selection mode, if the control apparatus rotates about X-axis, the displayed menu can be selected.

As an exemplary embodiment of the present invention, if the control apparatus 100 rotates in a counterclockwise direction, the menu left to the currently-selected menu can be selected, and if the control apparatus 100 is rotates in a clockwise direction, the menu right to the currently-selected menu can be selected.

When it is set to the screen enlargement movement (not illustrated), if the control apparatus rotates about Z-axis, the current screen can be moved to a screen connected to the right and the left sides.

As an exemplary embodiment of the present invention, if the control apparatus 100 rotates in a counterclockwise direction, the current screen can be moved to a screen connected to the left side, and if the control apparatus 100 rotates in a clockwise direction, the current screen can be moved to a screen connected to the right side.

Further, if the control apparatus 100 rotates about Y-axis, the current screen can be moved to a screen connected to the upper and downward sides.

As an exemplary embodiment of the present invention, if the control apparatus 100 rotates in a counterclockwise direction, the current screen can be moved to a screen connected to the upper side, and if the control apparatus 100 rotates in a clockwise direction, the current screen can be moved to a screen connected to the downward side.

Further, though not illustrated, if it is set to the screen stabilization mode, the trembling screen due to the external vibrations is stabilized. In the present embodiment, when the control apparatus 100 is built in a display unit such as a screen of a mobile device, if the screen trembles due to unnecessary movements of the display unit by external vibrations, the screen is moved in a direction opposite to the movement direction for stable viewing.

As described above, X-axis, Y-axis and Z-axis mentioned above in FIGS. 3 through 14 have been arbitrarily set. The X-axis, Y-axis, and Z-axis are perpendicular to one another. In addition, each pair of FIGS. 3 and 4, FIGS. 5 and 6, FIGS. 7 and 8, FIGS. 9 and 10, FIGS. 11 and 12, and FIGS. 13 and 14 may be based on the same axis. In an embodiment, rotations mentioned above may be made in at least one of the clockwise direction (a case where the control apparatus 100 rotates from left to right about an axis) and the counterclockwise direction (a case where the control apparatus 100 rotates from right to left about an axis).

Further, when rotating the control apparatus, with respect to the screen brightness, sound level, screen position, content adjustment, content selection and menu selection, the speed of the state change can be adjusted depending on the rotation angle or speed. For example, if the rotation angle is close to 20 degrees, it is possible to replay content at the double rate, and if the angle is close to 40 degrees, it is possible to replay content at the quadruple rate. Also, it is possible to implement analog-type sentiment by changing the state to be proportional to the rotation angle or speed of the control apparatus. Further, if the rotation speed of the control apparatus is high, the selected menu can be quickly converted, and if the rotation speed of the control apparatus is low, the selected menu can be slowly converted.

As described above, in a control apparatus and method according to the present invention, since motion (a change in the position) of the control apparatus is measured, the screen of a display device can be quickly keystoned.

In addition, the screen brightness, sound volume, video replay speed, screen enlargement and screen stabilization of the display device can be quickly adjusted by measuring the motion of the control apparatus.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in a descriptive sense only and not for purposes of limitation. Therefore, the scope of the invention is defined not by the detailed description of the invention but by the following claims, and all differences within the scope will be construed as being included in the present invention.

What is claimed is:

1. A control apparatus comprising:
   a measurement module which measures a motion of the control apparatus due to an external force;
   a signal generation module which generates a signal corresponding to the measured motion, wherein the signal is transmitted to a display device to adjust a state of the display device according to the signal; and
   a key setting module which selects one of predetermined modes and sets the state of the adjusted display device,
   wherein the predetermined modes comprise at least one of a screen brightness control mode, a sound volume control mode, a screen position control mode, a content control mode, a content selection mode, a menu selection mode, a screen enlargement movement mode, and a screen stabilization mode.

2. The apparatus of claim 1, wherein the motion includes rotation centering on at least one of an X-axis, a Y-axis, and a Z-axis that are perpendicular to one another.

3. The apparatus of claim 1, wherein the measurement module comprises at least one of an inertial sensor, a magnetic sensor, a vision sensor, an infrared sensor, a pressure sensor, and a sonar sensor.

4. The apparatus of claim 1, wherein the state of the display device comprises at least one of the screen brightness, sound volume and screen position of the display device, content adjustment, content selection, selection of menus indicated in the display device, screen enlargement movement, and screen stabilization.

5. The apparatus of claim 2, wherein, when the control apparatus rotates in the direction of at least one of the X-axis, the Y-axis, and the Z-axis, the display device trapezoids the screen thereof.

6. The apparatus of claim 2, wherein, when the control apparatus rotates in the direction of at least one of the X-axis, the Y-axis, and the Z-axis, the display device top-corner or bottom-corner the screen thereof.

7. The apparatus of claim 2, wherein, when the control apparatus rotates in the direction of at least one of the X-axis, the Y-axis, and the Z-axis, the display device rotates the screen thereof.

8. The apparatus of claim 2, wherein, when the control apparatus rotates in the direction of at least one of the X-axis, the Y-axis, and the Z-axis, the display device adjusts the sound volume thereof.

9. The apparatus of claim 2, wherein, when the control apparatus rotates in the direction of at least one of the X-axis, the Y-axis, and the Z-axis, the display device adjusts the screen brightness thereof.

10. The apparatus of claim 2, wherein, when the control apparatus rotates in the direction of at least one of the X-axis, the Y-axis, and the Z-axis, the display device executes a rewind function or a fast forward function.

11. The apparatus of claim 2, wherein, when the control apparatus rotates in the direction of at least one of the X-axis, the Y-axis, and the Z-axis, the display device moves to contents preceding or following contents that are currently being reproduced.

12. The apparatus of claim 2, wherein, when the control apparatus rotates in the direction of at least one of the X-axis, the Y-axis, and the Z-axis, the display device converts the selection of the menu indicated in the display device.

13. The apparatus of claim 2, wherein, when the control apparatus rotates in the direction of at least one of the X-axis, the Y-axis, and the Z-axis, the display device moves to a screen connected to the screen displayed in the display device.

14. The apparatus of claim 2, wherein, when the control apparatus rotates in the direction of at least one of the X-axis, the Y-axis, and the Z-axis, the display device stabilizes the screen displayed in the display device.

15. A control method comprising:
   measuring a motion of a control apparatus due to an external force;
   generating a signal corresponding to the measured motion;
   transmitting the signal to a display device to adjust a state of the display device; and
   selecting one of predetermined modes and setting the state of the adjusted display device,
   wherein the predetermined modes comprise at least one of a screen brightness control mode, a sound volume control mode, a screen position control mode, a content control mode, a content selection mode, a menu selection mode, a screen enlargement movement mode, a screen stabilization mode.

16. The method of claim 15, wherein the motion includes rotation in a direction of at least one of an X-axis, a Y-axis, and a Z-axis that are perpendicular to one another.

17. The method of claim 15, wherein the state of the display device comprises at least one of the screen brightness, sound volume and screen position of the display device, content adjustment, content selection, selection of a menu displayed in the display device, screen enlargement movement, and screen stabilization.

18. The method of claim 16, wherein, when the control apparatus rotates in the direction of at least one of the X-axis, the Y-axis, and the Z-axis, the adjusting of the state of the display device comprises trapezoiding the screen of the display device.

19. The method of claim 16, wherein, when the control apparatus rotates in the direction of at least one of the X-axis, the Y-axis, and the Z-axis, the adjusting of the state of the display device comprises top-corner or bottom-corner the screen of the display device.

20. The method of claim 16, wherein, when the control apparatus rotates in the direction of at least one of the X-axis, the Y-axis, and the Z-axis, the adjusting of the state of the display device comprises rotating the screen of the display device.

21. The method of claim 16, wherein, when the control apparatus rotates in the direction of at least one of the X-axis, the Y-axis, and the Z-axis, the adjusting of the state of the display device comprises adjusting the sound volume of the display device.

22. The method of claim 16, wherein, when the control apparatus rotates in the direction of at least one of the X-axis, the Y-axis, and the Z-axis, the adjusting of the state of the display device comprises adjusting the screen brightness of the display device.

23. The method of claim 16, wherein, when the control apparatus rotates in the direction of at least one of the X-axis, the Y-axis, and the Z-axis, the adjusting of the state of the display device comprises executing a rewind function or a fast forward function.

24. The method of claim 16, wherein, when the control apparatus rotates in the direction of at least one of the X-axis, the Y-axis, and the Z-axis, the adjusting of the state of the display device comprises moving to contents preceding or following contents that are currently being reproduced.

25. The method of claim 16, wherein, when the control apparatus rotates in the direction of at least one of the X-axis, the Y-axis, and the Z-axis, the adjusting of the state of the display device comprises converting selection of the menu displayed in the display device.

26. The method of claim 16, wherein, when the control apparatus rotates in the direction of at least one of the X-axis, the Y-axis, and the Z-axis, the adjusting of the state of the display device comprises moving to a screen connected to the screen displayed in the display device.

27. The method of claim 16, wherein, when the control apparatus rotates in the direction of at least one of the X-axis, the Y-axis, and the Z-axis, the adjusting of the state of the display device comprises stabilizing the screen displayed in the display device.

28. The method of claim 15, wherein, in the measuring of the motion of the control apparatus, the control apparatus comprises at least one of an inertial sensor, a magnetic sensor, a vision sensor, an infrared sensor, a pressure sensor, and a sonar sensor to measure the motion thereof.

* * * * *